(12) United States Patent
Roth

(10) Patent No.: US 11,714,975 B2
(45) Date of Patent: Aug. 1, 2023

(54) HIGH DENSITY READ CHAMBERS FOR SCANNING AND ENCODING RFID TAGGED ITEMS

(71) Applicant: Avery Dennison Retail Branding and Information Solutions, Mentor, OH (US)

(72) Inventor: Mark W. Roth, North Miami, FL (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 14/525,353

(22) Filed: Oct. 28, 2014

(65) Prior Publication Data

US 2016/0117534 A1 Apr. 28, 2016

(51) Int. Cl.
*G06K 7/10* (2006.01)
*G06F 21/32* (2013.01)
*G06K 9/00* (2022.01)

(52) U.S. Cl.
CPC ..... *G06K 7/10316* (2013.01); *G06K 7/10178* (2013.01); *G06K 7/10415* (2013.01); *G06K 7/10089* (2013.01)

(58) Field of Classification Search
CPC .............. G08B 13/14; G06K 7/10316; G06K 7/10178; G06K 7/10415; G06K 7/10089
USPC ........... 340/10.1, 572.1, 572.7; 235/385, 435
See application file for complete search history.

(56) References Cited

U.S. PATENT DOCUMENTS

| | | |
|---|---|---|
| 3,693,079 A | 9/1972 | Walker |
| 3,849,633 A | 11/1974 | Reitboeck et al. |
| 3,994,505 A | 11/1976 | Balha |
| 4,350,883 A | 9/1982 | Lagarde |
| 5,041,826 A | 8/1991 | Milheiser |
| 5,196,682 A | 3/1993 | Englehardt |
| 5,310,784 A | 5/1994 | Ide et al. |

(Continued)

FOREIGN PATENT DOCUMENTS

| | | |
|---|---|---|
| CN | 100573545 | 12/2009 |
| CN | 102424228 | 4/2012 |

(Continued)

OTHER PUBLICATIONS

Fraunhofer IFF: "RFID Tunnel Gates for Reliable Bulk Reading", Retrieved from the internet: http://www.iff.fraunhofer.de/content/dam/iff/en/documents/publications/rfid-tunnel-gates-for-reliable-bulk-reading-fraunhofer-iff.pdf [retrieved on Mar. 5, 2014].

*Primary Examiner* — Nam V Nguyen

(57) ABSTRACT

High density read chambers are provided for scanning and/or encoding a plurality of RFID tagged items. Such chambers may include an enclosure with an interior defined by upper and lower surfaces, with a sidewall extending therebetween. An access (such as a door) may be associated with at least one of the surfaces or the sidewall, with the access being at least partially opened to access the interior of the enclosure from an outside location. The chamber further includes an antenna positioned within the interior of the enclosure and an RFID reader associated with the antenna. The RFID reader receives signals from and/or transmits signals to the antenna, while the antenna emits a scanning or encoding signal within the interior of the enclosure, with at least a portion of at least one of the surfaces or the sidewall including a signal-reflective material facing the interior of the enclosure.

14 Claims, 3 Drawing Sheets

(56) References Cited

U.S. PATENT DOCUMENTS

| | | | |
|---|---|---|---|
| 5,689,239 A | 11/1997 | Turner | |
| 5,729,697 A * | 3/1998 | Schkolnick | G06Q 20/203 |
| | | | 235/383 |
| 5,815,252 A | 9/1998 | Price-Francis | |
| 6,107,921 A | 8/2000 | Eberhardt et al. | |
| 6,145,742 A | 11/2000 | Drexler | |
| 6,218,942 B1 | 4/2001 | Vega et al. | |
| 6,336,544 B1 | 1/2002 | Blad et al. | |
| 6,371,375 B1 | 4/2002 | Ackley et al. | |
| 6,435,407 B1 | 8/2002 | Fiordelisi | |
| 6,703,935 B1 * | 3/2004 | Chung | H04L 63/12 |
| | | | 340/572.7 |
| 6,946,951 B2 * | 9/2005 | Cole | G06K 7/0008 |
| | | | 340/10.1 |
| 6,949,951 B1 | 9/2005 | Young et al. | |
| 6,967,579 B1 | 11/2005 | Elizondo | |
| 7,256,682 B2 * | 8/2007 | Sweeney, II | G06K 17/00 |
| | | | 340/10.1 |
| 7,268,742 B2 * | 9/2007 | Rahim | H01Q 1/2216 |
| | | | 343/867 |
| 7,323,996 B2 | 1/2008 | Mullins | |
| 7,345,635 B2 | 3/2008 | Hohler | |
| 7,425,896 B2 | 9/2008 | Kawamata | |
| 7,468,670 B2 | 12/2008 | Liu et al. | |
| 7,518,516 B2 * | 4/2009 | Azevedo | G08B 13/1427 |
| | | | 340/572.1 |
| 7,602,288 B2 * | 10/2009 | Broussard | G06Q 10/087 |
| | | | 340/572.1 |
| 7,696,882 B1 * | 4/2010 | Rahimi | G06Q 10/087 |
| | | | 340/505 |
| 7,928,844 B2 * | 4/2011 | Mackenzie | G06Q 10/087 |
| | | | 340/572.1 |
| 7,942,323 B2 | 5/2011 | Brod et al. | |
| 7,997,486 B2 | 8/2011 | Ulrich et al. | |
| 8,093,989 B2 | 1/2012 | Deoalikar et al. | |
| 8,111,137 B2 | 2/2012 | Nagai et al. | |
| 8,149,094 B2 | 4/2012 | Deoalikar et al. | |
| 8,245,739 B1 | 8/2012 | Wade et al. | |
| 8,274,390 B2 | 9/2012 | Blake et al. | |
| 8,384,521 B2 * | 2/2013 | Matsen | G06K 7/0008 |
| | | | 340/10.1 |
| 8,496,166 B2 | 7/2013 | Burns et al. | |
| 8,576,051 B2 * | 11/2013 | Hansen | G06K 19/07749 |
| | | | 235/488 |
| 8,604,981 B2 | 12/2013 | Ehlen | |
| 8,901,205 B2 | 12/2014 | Yang et al. | |
| 9,013,307 B2 * | 4/2015 | Hussain | G06Q 50/24 |
| | | | 340/572.1 |
| 9,208,362 B1 * | 12/2015 | Fink | G06K 7/10336 |
| 9,245,162 B2 * | 1/2016 | Bouveresse | G06K 7/10178 |
| 9,792,476 B2 * | 10/2017 | Elizondo, II | G06K 7/10366 |
| 9,830,486 B2 | 11/2017 | Roth | |
| 9,852,316 B2 | 12/2017 | Garcia | |
| 10,078,767 B2 | 9/2018 | Tsirline et al. | |
| 10,094,855 B1 | 10/2018 | Fuhr et al. | |
| 2001/0015380 A1 | 8/2001 | Good et al. | |
| 2001/0022559 A1 | 9/2001 | Takahashi et al. | |
| 2001/0050654 A1 | 12/2001 | Killen et al. | |
| 2002/0070862 A1 * | 6/2002 | Francis | G06K 17/00 |
| | | | 340/572.1 |
| 2002/0180588 A1 | 12/2002 | Erickson et al. | |
| 2002/0183882 A1 | 12/2002 | Dearing et al. | |
| 2003/0085267 A1 | 5/2003 | Piotrowski et al. | |
| 2003/0189490 A1 * | 10/2003 | Hogerton | B31B 1/90 |
| | | | 340/572.8 |
| 2003/0214389 A1 | 11/2003 | Arneson et al. | |
| 2004/0032443 A1 | 2/2004 | Moylan et al. | |
| 2004/0046020 A1 | 3/2004 | Andreasson et al. | |
| 2004/0084526 A1 | 5/2004 | Knowles et al. | |
| 2004/0113850 A1 | 6/2004 | Olsen | |
| 2004/0153379 A1 | 8/2004 | Joyce et al. | |
| 2004/0172160 A1 | 9/2004 | O'Dougherty et al. | |
| 2004/0178269 A1 | 9/2004 | Pradhan et al. | |
| 2004/0196143 A1 | 10/2004 | Crump et al. | |
| 2005/0012613 A1 | 1/2005 | Eckstein et al. | |
| 2005/0068161 A1 | 3/2005 | Ichinose et al. | |
| 2005/0075900 A1 | 4/2005 | Arguimbau | |
| 2005/0076816 A1 | 4/2005 | Nakano | |
| 2005/0110641 A1 | 5/2005 | Mendolia et al. | |
| 2005/0116034 A1 | 6/2005 | Satake et al. | |
| 2005/0218219 A1 | 10/2005 | Sano et al. | |
| 2005/0253687 A1 | 11/2005 | Martinez et al. | |
| 2006/0004484 A1 | 1/2006 | Hornbaker et al. | |
| 2006/0043177 A1 | 3/2006 | Nycz et al. | |
| 2006/0043179 A1 | 3/2006 | Nycz et al. | |
| 2006/0054705 A1 | 3/2006 | Garton et al. | |
| 2006/0071070 A1 | 4/2006 | Maier | |
| 2006/0080819 A1 | 4/2006 | McAllister | |
| 2006/0170556 A1 | 8/2006 | Fang | |
| 2006/0187041 A1 | 8/2006 | Olsen et al. | |
| 2006/0208072 A1 * | 9/2006 | Ku | G06K 7/0008 |
| | | | 235/383 |
| 2006/0220859 A1 | 10/2006 | Nagai et al. | |
| 2006/0221363 A1 | 10/2006 | Roth et al. | |
| 2006/0232033 A1 | 10/2006 | Pint | |
| 2006/0287759 A1 | 12/2006 | Charych | |
| 2007/0001809 A1 * | 1/2007 | Kodukula | G06K 7/0008 |
| | | | 340/10.1 |
| 2007/0013485 A1 | 1/2007 | Edwards et al. | |
| 2007/0030150 A1 | 2/2007 | Mullins | |
| 2007/0057050 A1 | 3/2007 | Kuhno | |
| 2007/0080804 A1 | 4/2007 | Hirahara et al. | |
| 2007/0126578 A1 * | 6/2007 | Broussard | G06K 17/0022 |
| | | | 340/572.1 |
| 2007/0135961 A1 | 6/2007 | Ishida et al. | |
| 2007/0139181 A1 * | 6/2007 | Eren | G06Q 10/08 |
| | | | 340/500 |
| 2007/0185613 A1 | 8/2007 | Feldenzer | |
| 2007/0254587 A1 | 11/2007 | Schadler et al. | |
| 2007/0268133 A1 * | 11/2007 | Sanchez | G06Q 10/08 |
| | | | 340/568.1 |
| 2007/0279191 A1 | 12/2007 | Yamamoto et al. | |
| 2007/0279311 A1 | 12/2007 | Kai et al. | |
| 2008/0011836 A1 | 1/2008 | Adema et al. | |
| 2008/0018475 A1 * | 1/2008 | Breed | G01S 13/878 |
| | | | 340/572.7 |
| 2008/0061984 A1 * | 3/2008 | Breed | G01S 13/878 |
| | | | 340/572.7 |
| 2008/0094179 A1 | 4/2008 | Domenico et al. | |
| 2008/0122623 A1 | 5/2008 | Hause et al. | |
| 2008/0185540 A1 | 8/2008 | Turner et al. | |
| 2008/0213498 A1 | 9/2008 | Drzal et al. | |
| 2008/0231431 A1 | 9/2008 | Stawar et al. | |
| 2008/0237339 A1 | 10/2008 | Stawar et al. | |
| 2009/0033493 A1 | 2/2009 | Lin et al. | |
| 2009/0039147 A1 | 2/2009 | Yamamoto et al. | |
| 2009/0079565 A1 | 3/2009 | Mackenzie et al. | |
| 2009/0160646 A1 | 6/2009 | Mackenzie et al. | |
| 2009/0237217 A1 | 9/2009 | Ohkubo et al. | |
| 2009/0303003 A1 * | 12/2009 | Pritchard | G06Q 10/0833 |
| | | | 340/10.1 |
| 2009/0319072 A1 | 12/2009 | Fukui et al. | |
| 2010/0217678 A1 | 8/2010 | Goncalves | |
| 2010/0237999 A1 | 9/2010 | Hilgers | |
| 2011/0025569 A1 * | 2/2011 | Payne | H01Q 9/28 |
| | | | 343/727 |
| 2011/0068992 A1 * | 3/2011 | Payne | H01Q 1/36 |
| | | | 343/797 |
| 2011/0095866 A1 | 4/2011 | Karr | |
| 2011/0106681 A1 | 5/2011 | Cockerell | |
| 2011/0315766 A1 * | 12/2011 | Phillips | G06Q 10/087 |
| | | | 235/385 |
| 2012/0019364 A1 | 1/2012 | Reichenbach et al. | |
| 2012/0075073 A1 | 3/2012 | Fislage | |
| 2012/0075074 A1 * | 3/2012 | Frosch | G06K 7/0008 |
| | | | 340/10.1 |
| 2012/0149300 A1 | 6/2012 | Forster | |
| 2012/0161937 A1 | 6/2012 | Chen | |
| 2012/0256732 A1 | 10/2012 | McAllister | |
| 2013/0023851 A1 | 1/2013 | Maier et al. | |
| 2013/0048711 A1 | 2/2013 | Burns et al. | |

(56) References Cited

U.S. PATENT DOCUMENTS

| | | | |
|---|---|---|---|
| 2013/0057390 A1* | 3/2013 | Watt | G06K 19/0717 340/10.1 |
| 2013/0141222 A1 | 6/2013 | Garcia | |
| 2013/0342322 A1 | 12/2013 | Hinman et al. | |
| 2014/0158766 A1 | 6/2014 | Paske et al. | |
| 2014/0184391 A1* | 7/2014 | Elizondo, II | H04B 1/713 340/10.1 |
| 2014/0292499 A1 | 10/2014 | Zhang et al. | |
| 2014/0339297 A1 | 11/2014 | Bremer | |
| 2015/0029001 A1 | 1/2015 | Pleshek et al. | |
| 2015/0091707 A1 | 4/2015 | Morrow et al. | |
| 2015/0127362 A1 | 5/2015 | DeBusk et al. | |
| 2015/0136849 A1 | 5/2015 | Bremer et al. | |
| 2016/0117530 A1 | 4/2016 | Roth | |
| 2016/0117534 A1 | 4/2016 | Roth | |
| 2016/0300455 A1 | 10/2016 | Hutchings et al. | |
| 2017/0053071 A1 | 2/2017 | Caputo | |
| 2017/0308692 A1 | 10/2017 | Yano | |
| 2018/0060618 A1 | 3/2018 | Ferrer Alos | |
| 2018/0127219 A1 | 5/2018 | Wagner et al. | |
| 2018/0157873 A1 | 6/2018 | Roth | |
| 2018/0276432 A1 | 9/2018 | Manickam et al. | |
| 2018/0307959 A1 | 10/2018 | Pigott et al. | |
| 2019/0228193 A1 | 7/2019 | Roth | |
| 2021/0326666 A1 | 10/2021 | Mizuuchi et al. | |
| 2021/0406918 A1 | 12/2021 | Astvatsaturov et al. | |

FOREIGN PATENT DOCUMENTS

| | | | |
|---|---|---|---|
| CN | 202193383 | 4/2012 | |
| WO | WO-9641296 A1 * | 12/1996 | G06K 7/10178 |
| WO | 2000005674 | 2/2000 | |
| WO | 2007104339 | 9/2007 | |
| WO | 2009002156 | 12/2008 | |

* cited by examiner

HIGH DENSITY READ CHAMBERS FOR SCANNING AND ENCODING RFID TAGGED ITEMS

BACKGROUND

1. Field of the Disclosure

The present subject matter relates to radio frequency identification ("RFID") devices. More particularly, the present subject matter relates to chambers for scanning and/or encoding containers housing a plurality of RFID tagged items.

2. Description of Related Art

It is known to employ RFID technology to tag and identify individual pieces of merchandise. Typically, a plurality of RFID tagged items will be placed into a carton or similar container for shipment from a manufacturing or packaging facility to a retail location. Depending on the demands of the retail location, a plurality of cartons or containers may be delivered, with two or more cartons or containers shipped together on a pallet or the like.

Before the packaged items are shipped out of the manufacturing or packaging facility and/or when the packaged items arrive at the retail location, it may be advantageous to check the contents of the carton or container to ensure that the proper number of items are in the container, as well as the proper assortment of items. According to one known approach, handheld RFID scanning devices are used to catalog the contents of a carton or container. One possible disadvantage of such an approach is apparent when attempting to scan a carton or container in an environment where a plurality of cartons and/or RFID tagged items are in close proximity, as it may be difficult to control signal and energy with such handheld devices to scan one specific carton or container. Furthermore, proper cataloging of the carton or container is reliant upon the skill and diligence of the individual operating the handheld device.

According to another approach, open scanning portals are used to catalog individual cartons or containers or a plurality of cartons or containers together on a pallet or the like. These are typically gateways at dock doors that forklifts drive through, with the RFID scanning devices associated with the portal being intended to scan the tagged items within the cartons or containers. Such systems may be acceptable when only scanning labels on the cartons or containers or pallets, as only a small numbers of labels are being scanned, but they may be less successful when attempting to scan individual items housed within a carton or container, due to the increased density of RFID tags.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

In one aspect, a high density read chamber for scanning a plurality of RFID tagged items includes an enclosure. The enclosure has upper and lower surfaces, with a sidewall extending between the upper and lower surfaces to define an interior of the enclosure. An access is associated with at least one of the upper surface, the lower surface, and the sidewall and is configured to be at least partially opened to access the interior of the enclosure from an outside location. The chamber also includes an antenna positioned within the interior of the enclosure and an RFID reader. The RFID reader is configured to receive signals from and/or transmit signals to the antenna, with the antenna being configured to emit a scanning signal within the interior of the enclosure. At least a portion of at least one of the upper surface, the lower surface, and the sidewall includes a signal-reflective material facing the interior of the enclosure.

In another aspect, a high density read chamber for encoding a plurality of RFID tagged items includes an enclosure. The enclosure has upper and lower surfaces, with a sidewall extending between the upper and lower surfaces to define an interior of the enclosure. An access is associated with at least one of the upper surface, the lower surface, and the sidewall and is configured to be at least partially opened to access the interior of the enclosure from an outside location. The chamber also includes an antenna is positioned within the interior of the enclosure and an RFID reader. The RFID reader is configured to receive signals from and/or transmit signals to the antenna, with the antenna being configured to emit an encoding signal within the interior of the enclosure. At least a portion of at least one of the upper surface, the lower surface, and the sidewall includes a signal-reflective material facing the interior of the enclosure.

DESCRIPTION OF THE ILLUSTRATED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figure 1:
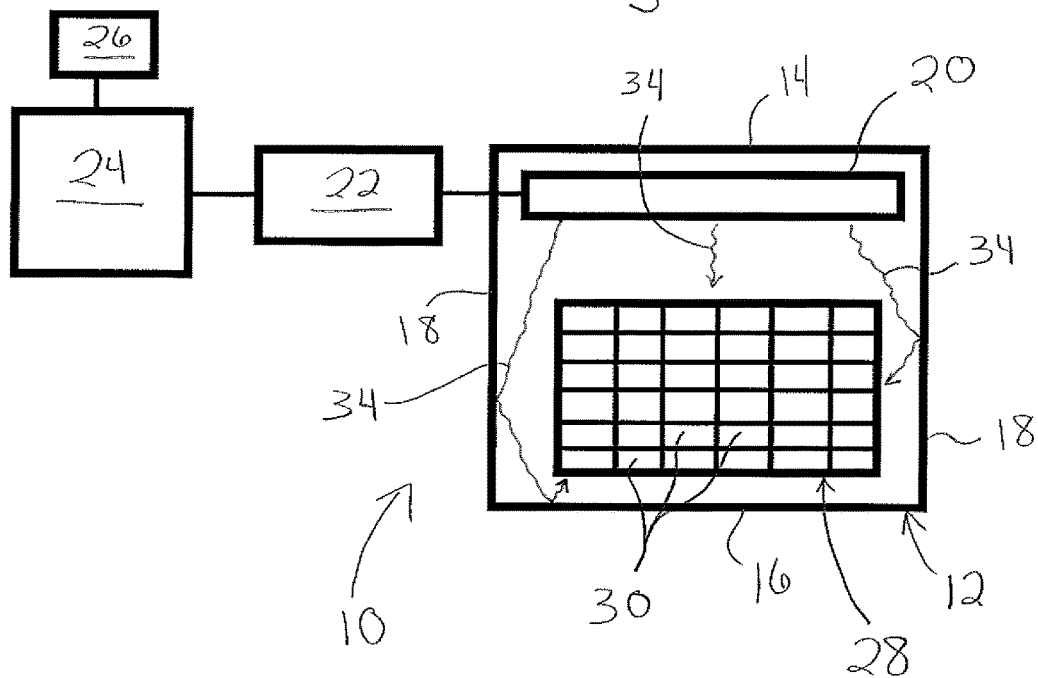
FIG. 1 is a schematic diagram of a high density read chamber configured for scanning and/or encoding a plurality of RFID tagged items in a container according to an aspect of the present disclosure.

FIG. 1 is a diagrammatic view of an exemplary high density read chamber 10 according to an aspect of the present disclosure. The chamber 10 includes an enclosure 12 defined by upper and lower surfaces 14 and 16, with a sidewall 18 extending between the upper and lower surfaces 14 and 16. An antenna or RFID signal source 20 is positioned within the interior of the enclosure 12. The antenna 20 may be variously configured (provided that it is capable of sending and receiving RFID signals), but in one embodiment is provided as a dipole-type antenna that is configured to send RFID signals to and receive RFID signals from other RFID devices (e.g., RFID tags and an RFID reader).

In addition to the enclosure 12, the chamber 10 may include an RFID reader 22 associated with the antenna 20 (via either a wired or wireless connection), a user interface 24 (which is an "all-in-one" unit in one embodiment, having a touchscreen with an integrated CPU or controller and data storage capability) associated with the RFID reader 22, and/or a barcode reader 26 associated with the user interface 24. Additional or alternative components may also be incorporated into the chamber without departing from the scope of the present disclosure.

The enclosure 12 of FIG. 1 is sized and configured to accommodate a carton or container 28 housing a plurality of RFID tagged items 30. In one embodiment, the enclosure 12 is provided as an approximately 36-inch cube, but differently sized and shaped enclosures may be advantageous, depending on the size and shape of the carton or container 28 to be processed by the chamber 10. The enclosure 12 includes at least one access 32 (FIG. 3), such as a door or portal, associated with at least one of the upper surface 14, the lower surface 16, and/or the sidewall 18. The access 32 may be at least partially opened to access the interior of the enclosure 12 from an outside location, which allows a carton or container 28 to be placed into the enclosure 12 for processing (with the access 32 preferably being closed during processing) and subsequently removed from the enclosure 12 following processing.

The antenna 20 may be positioned at various locations within the interior of the enclosure 12 (e.g., associated with the sidewall 18 or the lower surface 16), but is illustrated in FIG. 1 as being associated with the upper surface 14. Such a configuration may be advantageous to decrease the risk of the carton or container 28 contacting and damaging the antenna 20 during use of the chamber 10.

Figure 3:
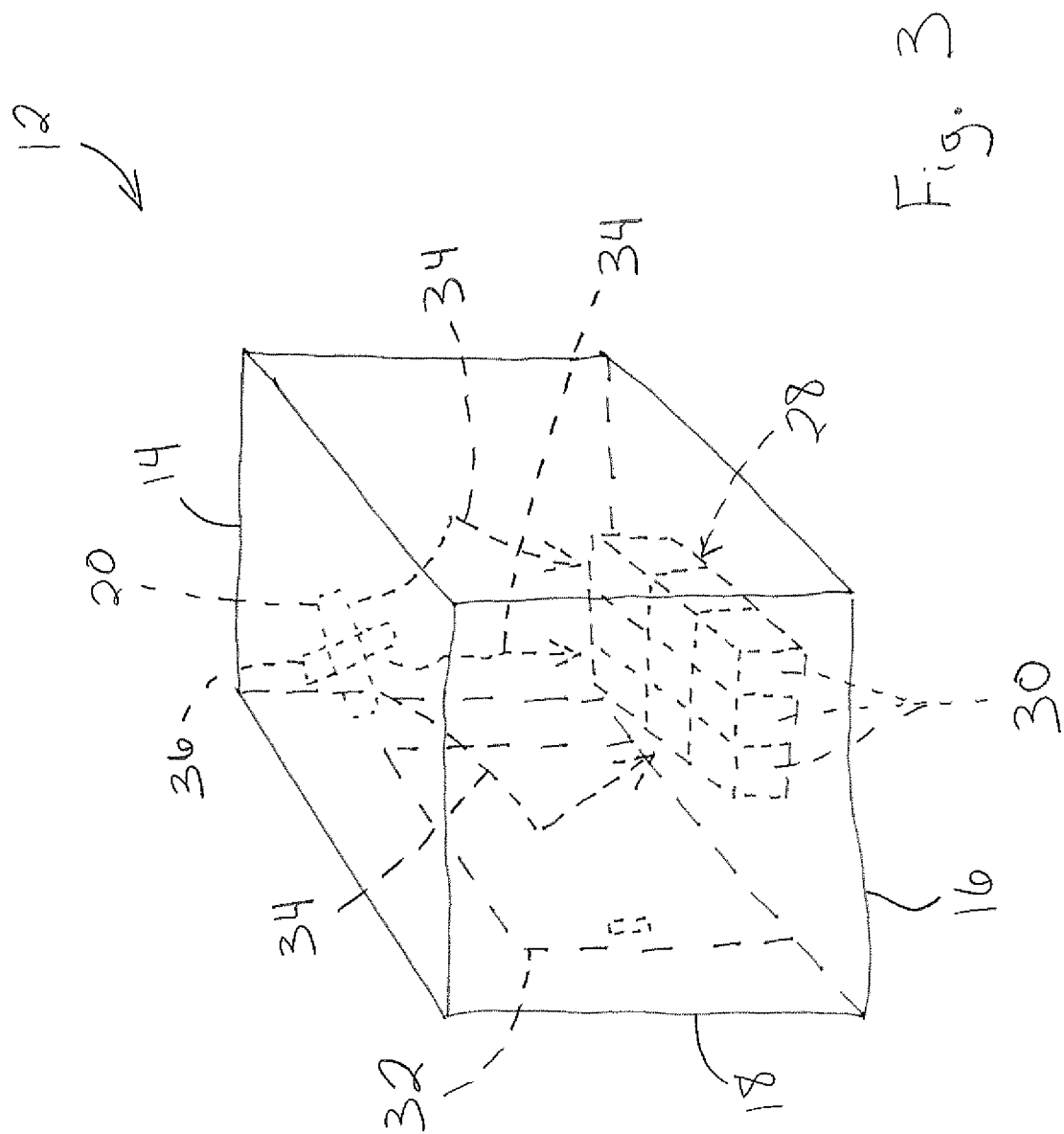
FIG. 3 is a perspective view of an alternative embodiment of a high density read chamber according to an aspect of the present disclosure.
Figure 4:
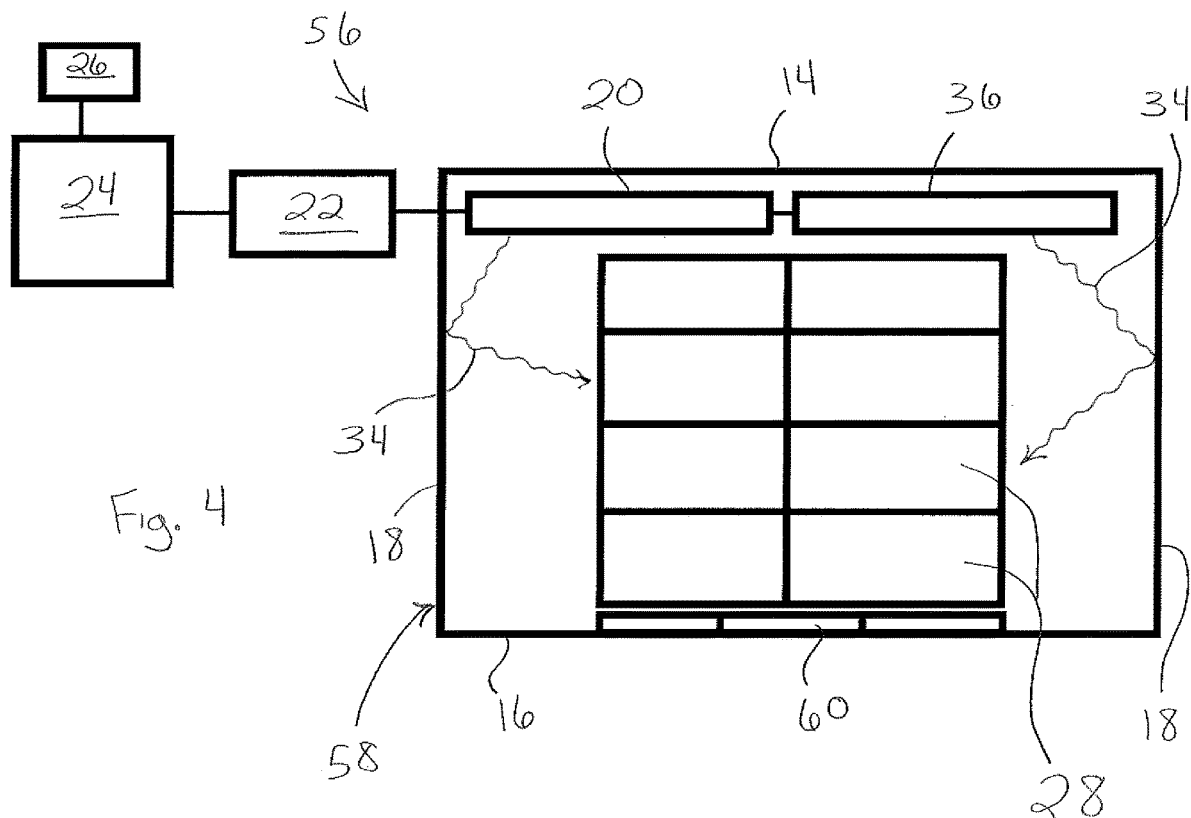
FIG. 4 is a schematic diagram of a high density read chamber configured for scanning and/or encoding a plurality of RFID tagged items in a plurality of containers on a pallet according to an aspect of the present disclosure.

In use, the antenna 20 emits signals 34 within the enclosure 12 that contact or communicate with the RFID tagged items 30. If the chamber 10 is functioning to encode the items 30, then the antenna 20 emits an encoding signal, whereas the antenna 20 emits a scanning signal when the chamber 10 is functioning to scan the items 30. The same antenna 20 may be used for both encoding and scanning tasks, but it is also within the scope of the present disclosure for a plurality of antennae to be provided, with one or more antenna or antennae having encoding duties and another antenna or antennae having scanning duties. For example, FIGS. 3 and 4 illustrate chambers having multiple antennae 20 and 36. FIG. 3 shows two antennae 20 and 36 arranged in a crossed or "X" pattern (which may be advantageous for dispersing scanning/encoding signals 34 throughout the enclosure 12), while FIG. 4 shows two antennae 20 and 36 positioned side-by-side. It should be understood that these two arrangements are merely exemplary, and that multiple antennae may be associated with any portion of the enclosure (including different antennae associated with different walls or surfaces) and/or different orientations without departing from the scope of the present disclosure. If multiple antennae are provided within the enclosure, they may be similarly or differently configured. It is also within the scope of the present disclosure for multiple multi-functional (i.e., scanning and encoding) antennae to be provided, which may be advantageous for better ensuring that all of the RFID tagged items within the enclosure are exposed to the signals from the antennae.

In addition to providing multiple antennae, it may also be advantageous for the surfaces defining the interior of the enclosure 12 to include a signal-reflective material. By providing a signal-reflective enclosure 12, an antenna 20 (or antennae) positioned in one location within the enclosure 12 may emit signals that can reach RFID tagged items 30 positioned at various locations throughout the interior of the enclosure 12. In one embodiment, at least a portion of at least one of the upper surface 14, the lower surface 16, and/or the sidewall 18 includes a signal-reflective material facing the interior of the enclosure 12, although it may be preferred for all or substantially all of the upper surface 14, the lower surface 16, and the sidewall 18 to comprise a signal-reflective material for improved signal reflection. For example, in one embodiment, the upper surface 14, the lower surface 16, and the sidewall 18 are each formed of a signal-reflective metallic material (e.g., stainless steel skin) that may be supported by a painted metal frame or the like. By such a configuration, it has been found that cartons or containers 28 having 1,600 RFID tagged items 30, as well as multiple cartons or containers 28 positioned within the same enclosure 12 can be processed, at least partially due to the signal-reflective properties of the enclosure 12.

Figure 2:
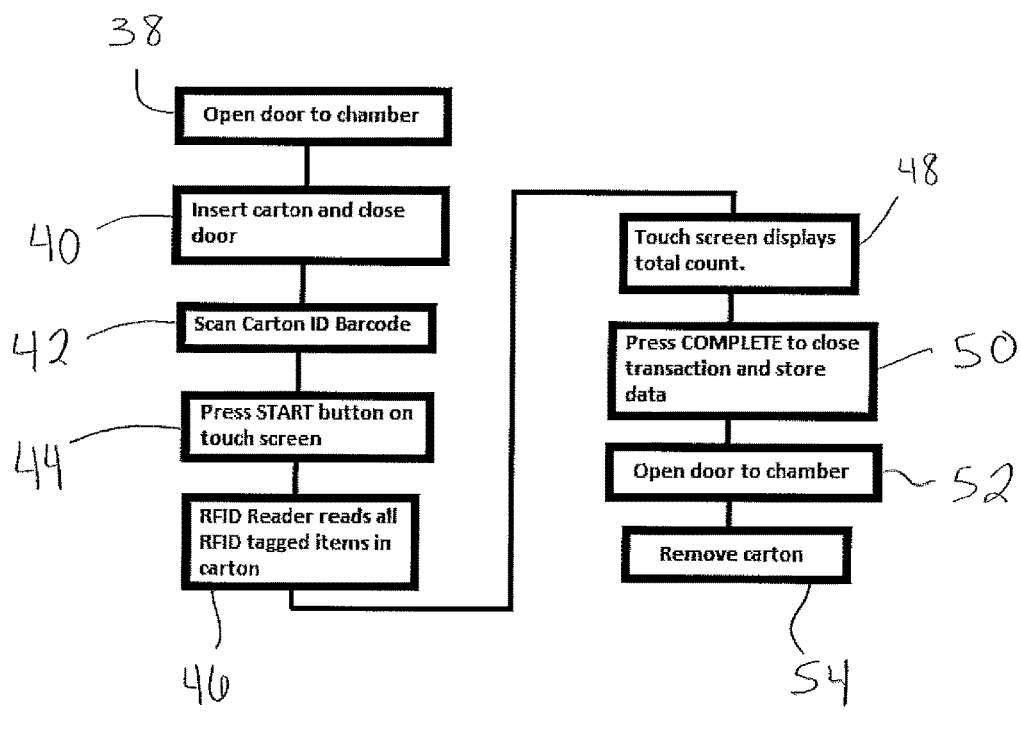
FIG. 2 is a flowchart which shows an exemplary method for using the chamber of FIG. 1 to scan the RFID tagged items in the container.

FIG. 2 shows an exemplary method of using the chamber 10 of FIG. 1 or of FIG. 3 to scan RFID tagged items 30 in a carton or container 28. In a first step 38, the access or door 32 of the enclosure 12 is at least partially opened. In a second step 40, the carton or container 28 is placed into the interior of the enclosure 12 and then the access or door 32 is closed. With the carton or container 28 in the enclosure 12, a barcode associated with the carton or container 28 may be scanned using the barcode reader 26 as a third step 42. In an alternative approach, the barcode may be scanned prior to closing the access or door 32. In another alternative approach, the barcode may be scanned prior to inserting the carton or container 28 into the enclosure 12, although it may be advantageous to scan the barcode inside of the enclosure 12 to ensure that the carton or container 28 to be processed corresponds to the scanned barcode.

Next, an operator may initiate the scanning procedure using the user interface 24 (e.g., by pressing a "START" button or icon, if the user interface 24 is a touchscreen) as a fourth step 44. Initiating the scanning procedure instructs the reader linked to the antenna inside the enclosure to emit signal through the antennae 20 (or antennae 20 and 36) to emit scanning signals that contact or communicate with the RFID tagged items 28, with the antenna 20 (or antennae 20 and 36) receiving information about the scanned items 28 and transmitting such information to the RFID reader 22 (step 46). Typically, the scanning step is completed in seconds. The RFID reader 22 may communicate with the user interface 24 to display information about the RFID tagged items 30, such as the total count (step 48) and other information (e.g., a breakdown of the different types of items in the carton or container 28 and the count for each type of item, the date and time of the procedure, etc.). The operator may then verify that the scanning procedure is complete, for example by pressing a "COMPLETE" button or icon (step 50), which stores the data scanned by the chamber 10. Alternatively, the chamber 10 may automatically store the data and end the scanning procedure without requiring confirmation from the operator.

With the scanning procedure ended, the operator may open the access or door 32 (step 52) and remove the carton or container 28 from the enclosure 12 (step 54). Additional and/or alternative steps may be incorporated into the illustrated procedure without departing from the scope of the present disclosure. For example, the chamber 10 may check the scanned items 30 against an expected count and inventory to ensure that the proper number and type of items 30 are present in the carton or container 28. If the results differ from what is expected, then the operator (or the system controller) may initiate a "RESET" procedure to repeat the scan procedure.

A similar procedure may be carried out when using the chamber 10 to encode the RFID tagged items 30. The principal difference between the scanning procedure and the encoding procedure is that encoding information is sent from the RFID reader 22 to the antenna 20 (or antennae 20 and 36) prior to the antenna 20 (or antennae 20 and 36) emitting an encoding signal. Bulk encoding of the items 30 is possible by recognizing the different tag IDs given to the RFID chip or tag of each item 30. By using the unique identifying numbers, each individual tagged item 30 can be encoded, even while all of the RFID chips or tags within the enclosure 12 are subjected to the encode instruction, as only the RFID chip or tag with the specified tag ID will be encoded.

FIG. 4 illustrates a variation of the enclosures of FIGS. 1 and 3. In the embodiment of FIG. 4, the chamber 56 has a larger enclosure 58 that is sized and configured to receive a pallet 60 or the like on which multiple cartons or containers 28 housing RFID tagged items 30 are positioned. It should be understood that the chamber 56 is not limited to scanning/encoding items 30 within cartons or containers 28 on a pallet 60, as the chamber 56 in which a reader is linked to an antenna may be used to scan single cartons/containers 28, a plurality of loose cartons or containers 28, or any other arrangement of RFID tagged items 30 that can fit into the interior of the enclosure 58.

As described above, the enclosure 58 of FIG. 4 is shown with side-by-side antennae 20 and 36 (which may be replaced by a single antenna or a pair of crossed antennae, as in FIG. 3, or any other antenna arrangement) and the access may be larger (e.g., a bi-fold door), but the enclosure 58 and other components of the chamber 56 may otherwise be provided according to the above description of the chamber 10 of FIG. 1.

Figure 5:
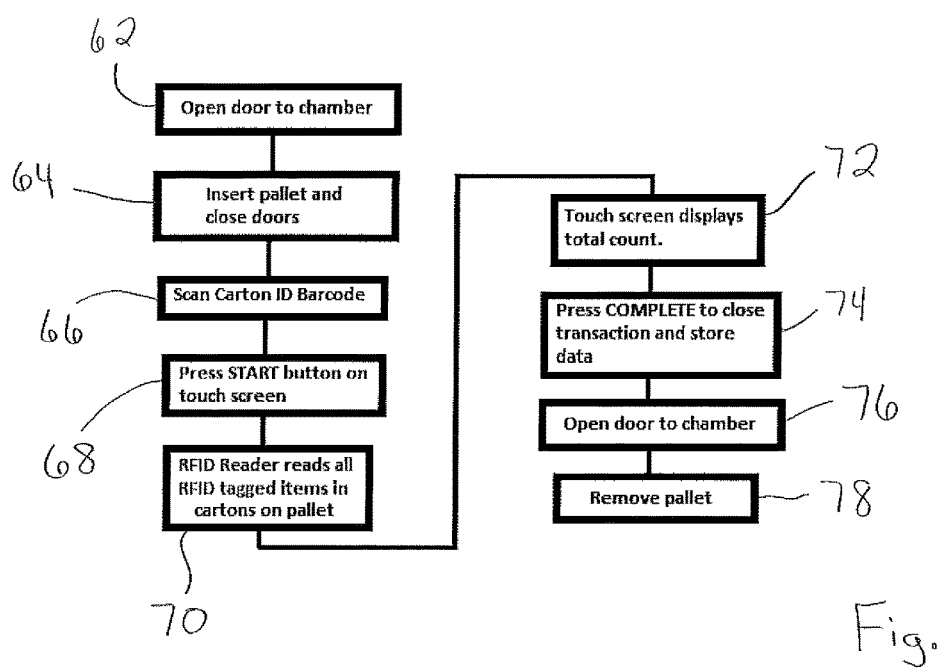
FIG. 5 is a flowchart which shows an exemplary method for using the chamber of FIG. 4 to scan the RFID tagged items in the containers.

FIG. 5 shows an exemplary method of using the chamber 56 of FIG. 4 to scan RFID tagged items 30 in a cartons or containers 28 on a pallet 60. In a first step 62, the access or door of the enclosure 58 is at least partially opened. In a second step 64, the pallet 60 is then placed into the interior of the enclosure 58 and then the access or door is closed. With the pallet 60 in the enclosure 58, a barcode or barcodes associated with the pallet 60 and/or the cartons/containers 28 may be scanned using the barcode reader 26 as a third step 66. In an alternative approach, the barcode(s) may be scanned prior to closing the access or door. In another alternative approach, the barcode(s) may be scanned prior to inserting the pallet 60 into the enclosure 58, although it may be advantageous to scan the barcode(s) while positioned inside of the enclosure 58 to ensure that the pallet 60 and cartons/containers 28 to be processed correspond to the scanned barcode(s).

Next, an operator may initiate the scanning procedure using the user interface 24 (e.g., by pressing a "START" button or icon, if the user interface 24 is a touchscreen) as a fourth step 68. Initiating the scanning procedure instructs the antenna 20 and 36 to emit scanning signals that contact or communicate with the RFID tagged items 30, with the antennae 20 and 36 receiving information about the scanned items 30 and transmitting such information to the RFID reader 22 (step 70). Typically, the scanning step is completed in seconds. The RFID reader 22 may communicate with the user interface 24 to display information about the RFID tagged items 30, such as the total count (step 72) and other information (e.g., a breakdown of the different types of items in the cartons/containers 28 and the count for each type of item, the date and time of the procedure, etc.). The operator may then verify that the scanning procedure is complete, for example by pressing a "COMPLETE" button or icon (step 74), which stores the data scanned by the chamber 56. Alternatively, the chamber 56 may automatically store the data and end the scanning procedure without requiring confirmation from the operator.

With the scanning procedure ended, the operator may open the access or door (step 76) and remove the pallet 60 from the enclosure 58 (step 78). Additional and/or alternative steps may be incorporated into the illustrated procedure without departing from the scope of the present disclosure. For example, the chamber 56 may check the scanned items 30 against an expected count and inventory to ensure that the proper number and type of items 30 are present in the cartons/containers 28 on the pallet 60. If the results differ from what is expected, then the operator (or the system controller) may initiate a "RESET" procedure to repeat the scan procedure.

A similar procedure may be carried out when using the chamber 56 to encode the RFID tagged items 30. As described above with respect to an encoding procedure using the chamber 10 of FIG. 1, the principal difference between the scanning procedure and the encoding procedure is that encoding information is sent from the RFID reader 22 to the antennae 20 and 36 prior to the antennae 20 and 36 emitting an encoding signal.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A high density read chamber for scanning a plurality of RFID tagged items, comprising:
    an enclosure including an upper surface, a lower surface, and a sidewall extending between the upper and lower surfaces to define an interior of the enclosure, wherein at least a portion of at least one of the upper surface, the lower surface, and the sidewall includes a signal-reflective material facing the interior of the enclosure;
    an access associated with at least one of the upper surface, the lower surface, and the sidewall and configured to be at least partially opened to access the interior of the enclosure from an outside location;
    a first and second antennae positioned side-by-side on a same surface within the interior of the enclosure such that at least one antenna is used for both emitting a signal for encoding one or more of the plurality of RFID tagged items and emitting a scanning signal within the interior of the enclosure for scanning one or more of the plurality of RFID tagged items, wherein the at least one antenna of the first and second antennae is a dipole-type antenna; and an RFID reader associated with the first and second antennae and configured to:
 receive signals from and/or transmit signals to the first and second antennae,
 store data scanned in the chamber,
 send encoding information to the at least one antenna of the first and second antennae, and
 end a scanning procedure.

2. The high density read chamber of claim 1, wherein the first and second antennae are associated with the upper surface of the enclosure.

3. The high density read chamber of claim 1, where at least the first and second antennae are used for both encoding and scanning and the at least the first and second antennae are positioned within the interior of the enclosure.

4. The high density read chamber of claim 3, wherein at least the first and second antenna are associated with the upper surface of the enclosure and the first and second antennae are both a dipole-type antenna.

5. The high density read chamber of claim 1, further comprising a user interface associated with the RFID reader.

6. The high density read chamber of claim 5, wherein the user interface comprises a touchscreen.

7. The high density read chamber of claim 5, further comprising a barcode reader associated with the user interface.

8. The high density read chamber of claim 1, wherein the upper surface, the lower surface, and the sidewall are formed of a signal-reflective material.

9. The high density read chamber of claim 1, wherein the upper surface, the lower surface, and the sidewall are formed of stainless steel.

10. A high density read chamber for encoding a plurality of RFID tagged items, comprising:
 an enclosure including an upper surface, a lower surface, and a sidewall extending between the upper and lower surfaces to define an interior of the enclosure, at least a portion of at least one of the upper surface, the lower surface, and the sidewall includes a signal-reflective material facing the interior of the enclosure;
 a door capable of opening and closing as an access associated with at least one of the upper surface, the lower surface, and the sidewall and configured to be at least partially opened to access the interior of the enclosure from an outside location;
 a first and second antennae positioned within the interior of the enclosure and the first and second antennae are oriented in a crossed configuration and the first and second antennae are associated with the upper surface of the enclosure, wherein at least one antenna of the first and second antennae is used for emitting a signal for encoding one or more of the plurality of RFID tagged items, wherein the first and second antennae are both a dipole-type antenna;
 an RFID reader associated with the first and second antennae and configured to:
  receive signals from and/or transmit signals to the first and second antennae, wherein the first and second antennae are configured to emit an encoding signal within the interior of the enclosure,
  send encoding information to the at least one antenna of the first and second antennae, and
  end a scanning procedure;
 a user interface associated with the RFID reader, where the user interface is configured to initiate an encoding procedure; and
 a barcode reader associated with the user interface.

11. The high density read chamber of claim 10, wherein the first and second antennae are associated with the upper surface of the enclosure.

12. The high density read chamber of claim 10, wherein the user interface comprises a touchscreen.

13. The high density read chamber of claim 10, wherein the upper surface, the lower surface, and the sidewall are formed of a signal-reflective material.

14. The high density read chamber of claim 10, wherein the upper surface, the lower surface, and the sidewall are formed of stainless steel.

* * * * *